United States Patent

Runkle

[15] 3,693,654

[45] Sept. 26, 1972

[54] FRICTIONLESS PRESSURE SEAL

[72] Inventor: Dean E. Runkle, South Bend, Ind.

[73] Assignee: The Bendix Corporation

[22] Filed: Nov. 23, 1970

[21] Appl. No.: 91,694

[52] U.S. Cl. .................................................137/596

[51] Int. Cl. .........................F16k 11/07, F16k 11/10

[58] Field of Search.........251/129; 137/596, 625.68, 625.69

[56] References Cited

UNITED STATES PATENTS

| | | |
|---|---|---|
| 2,374,593 | 4/1945 | Ernst et al..............251/129 X |
| 3,270,622 | 9/1966 | Stephens...........137/625.68 X |
| 3,370,613 | 2/1968 | Weaver ................137/625.69 |
| 3,581,772 | 6/1971 | Wills.....................137/625.69 |

*Primary Examiner*—Henry T. Klinksiek
*Attorney*—Ken C. Decker and Plante, Hartz, Smith and Thompson

[57] ABSTRACT

A hydraulic brake booster is disclosed which includes a housing in which a spool valve is slidably supported to control fluid communication between a fluid pressure source and the booster pressure chamber. A frictionless pressure seal is provided to prevent fluid leakage from the pressure chamber to the outlet port through the interface between the outer circumferential surface of the spool and the wall of the housing. The frictionless pressure seal consists of a passage extending radially through the wall of the spool that communicates an annular groove in the outer circumferential surface of the spool with high pressure fluid contained in a channel provided within the spool. The high pressure fluid in the groove prevents fluid communication from the booster pressure chamber to the outlet port of the booster through the interface between the spool and the wall of the bore.

5 Claims, 2 Drawing Figures

PATENTED SEP 26 1972 3,693,654

INVENTOR.
DEAN E. RUNKLE
BY Ken C. Decker
ATTORNEY

FRICTIONLESS PRESSURE SEAL

BACKGROUND OF THE INVENTION

This invention relates to a hydraulic brake booster.

Because of their smaller size and lower weight, hydraulic brake boosters are expected to be used in lieu of existing vacuum boosters in the near future for vehicles having power assisted brakes. A common hydraulic brake booster design provides a spool valve which is slidably mounted within the booster housing which controls communication between the inlet port and the booster pressure chamber. Therefore, in order for the booster to work satisfactorily, the valve spool must be "hydraulically balanced" at all times. In other words, equal hydraulic pressures must act on opposite ends of the valve spool regardless of the mode of operation of the brake booster. A brake booster typical of this design is disclosed in copending U.S. Pat. application Ser. No. 38,087 filed May 18, 1970, now U.S. Pat. No. 3,610,102, owned by the assignee of the present invention, and incorporated herein by reference. The brake booster disclosed in the aforementioned application includes a secondary valve mechanism which is slidably mounted on the end of the spool valve which closes when maximum hydraulic pressure is achieved in the booster pressure chamber, to prevent a further build-up of pressure in the pressure chamber, thereby limiting the output pressure of the vehicle master cylinder. However, when the aforementioned hydraulic booster is operated at maximum pressure levels, fluid pressure has a tendency to leak between the pressure chamber and the booster outlet port through the interface between the spool valve and the booster housing. Therefore, a seal must be provided to prevent this leakage which results in reduced pressure in the booster pressure chamber, causing the spool valve to become hydraulically unbalanced, common rubber seals provide far too much friction and therefore retards proper sliding movement of the spool valve.

SUMMARY OF THE INVENTION

Therefore, an important object of my invention is to prevent leakage between the pressure chamber and the outlet port of a hydraulic brake booster through the interface between the valve spool and the wall of the housing.

Another important object of my invention is to provide a high-pressure sliding seal which is essentially frictionless.

DETAILED DESCRIPTION

Figure 1:
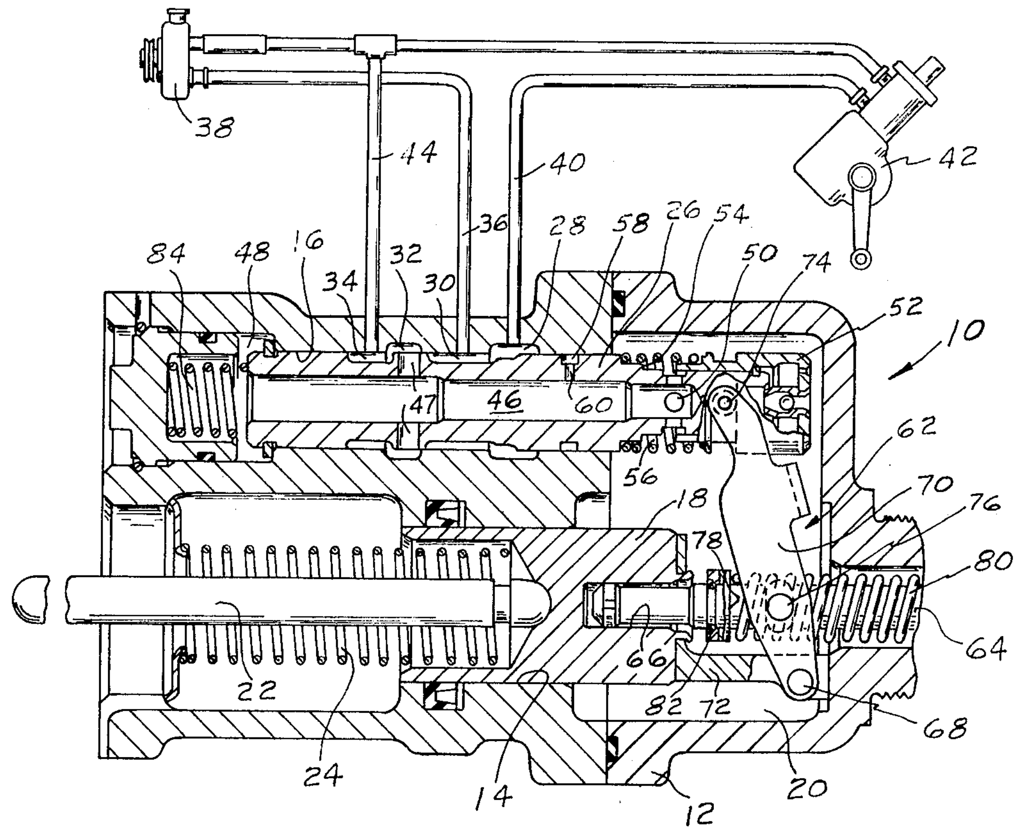
FIG. 1 is a schematic view of a vehicle hydraulic system with a brake booster made pursuant to the teachings of my present invention illustrated in cross section.

Referring now to the drawings, a brake booster generally indicated by the numeral 10 includes a housing 12 defining a first bore 14 and a second bore 16 therewithin. A piston 18 is slidably disposed within the bore 14, and one end of the piston 18 projects into a pressure chamber 20 defined within the housing 12. A rod 22 interconnects the other end of the piston 18 with a standard automotive master cylinder (not shown) mounted to the left of the booster housing 12. A return spring 24 yieldably urges the piston 18 and the rod 22 to the right viewing FIG. 1, toward the brake release position. A valve spool 26 is slidably disposed in the bore 16 and is provided with spaced grooves that cooperate with corresponding grooves in the wall of the bore 16 to define annular fluid cavities 28, 30, 32, and 34. An inlet port 36 communicates the cavity 30 with the high pressure side or outlet of a power steering pump 38. An outlet port 40 communicates the cavity 28 with the inlet of a power steering gear 42. The cavity 34 is communicated to the low pressure side or inlet of the pump 38 by exhaust port 44. The outlet of the power steering gear 42 is also communicated with the inlet of the pump 38.

The spool valve 26 is provided with an axially extending channel 46 therewithin which is communicated with the cavity 32 by radially extending passages 47. One end of the channel 46 communicates with a chamber 48 defined between the end of the spool valve and the end of the bore. Openings 50 extending radially through the spool valve 26 communicate the channel 46 with the booster pressure chamber 20. A secondary valve member or cap 52 is slidably mounted on the end of the spool valve 26 that projects into the pressure chamber 20 and is shiftable thereon from a first position (illustrated in the drawings) in which fluid communication through the openings 50 between the channel 46 and the pressure chamber 20 is permitted to a second position in which the end of the cap member 52 engages a shoulder 54 on the valve spool 26 to thereby prevent fluid communication through the openings 50. A spring 56 yieldably urges the cap member 52 toward the first position. Details of the construction and operation of the secondary valve member 52 are disclosed in the aforementioned U.S. Pat. application Ser. No. 38,087, filed May 18, 1970, now U.S. Pat. No. 3,610,102, owned by the assignee of the present invention and incorporated herein by reference. Spool valve 26 is further provided with a circumferentially extending groove 58 in the outer circumferential surface of the spool valve in that section of the latter that extends between the cavity 28 and the pressure chamber 20. A passage 60 communicates the groove 58 with the channel 46. The spool valve 26 is yieldably urged to the right viewing FIG. 1 by a spring 84 mounted in the chamber 48. The spring constant of the spring 84 is less than the spring constant of the spring 56 to permit the spool valve 26 to be shifted when a force is applied to the cap member 52 by operator-actuated means generally indicated by the numeral 62.

Operator-operated means 62 includes an input rod 64 that extends from the pressure chamber 20. One end of the rod 64 is slidably supported in a blind bore 66 provided in the piston 20, and the other end of the rod 64 is connected to the usual brake pedal (not shown) mounted in the operator's compartment of the vehicle. Operator-actuated means 62 further includes lever means 70, one end of which is pivotally connected to a bracket 72 carried by the piston 20 by a pivot 68. The other end of the lever means 70 is connected to the cap members 52 by another pivot 74. A third pivot 76 interconnects the lever means 70 with a sleeve 78 which telescopingly receives the rod 64. A spring 80 yieldably urges the sleeve 68 into engagement with a stop ring 82 carried on the rod 64 so that movement of the rod 64 will pivot the lever means 70 about the pivot 68, to force the spool valve 26 to the left viewing FIG. 1. Details of the construction and operation of the operator-actuated means 62 are disclosed in U.S. Pat. Application Ser. No. 35,800, filed May 8, 1970, now U.S. Pat. No. 3,625,005 owned by the assignee of the present invention and incorporated herein by reference.

MODE OF OPERATION

When the vehicle's brakes are released, as is illustrated in FIG. 1, substantially all of the fluid flowing into the inlet port 36 is communicated directly to the outlet port 40 and the exhaust port 44 is communicated to the pressure chamber 20 through the passages 47 and channel 46. However, as the spool valve 26 is urged to the left by operation of the operator-operated means 62, communication between the cavities 34 and 32 is terminated, thereby also terminating fluid communication between the pressure chamber 20 and the exhaust port 44. Simultaneously, fluid communication between the cavities 30 and 32 is initiated, thereby communicating a portion of the fluid flowing into the inlet port 36 into the pressure chamber 20 through the passages 47 and channel 46. High pressure fluid in the pressure chamber 20 acts against the right hand side of the piston 18, thereby urging the latter to the left, viewing FIG. 1, to effect a brake operation. When the brakes of the vehicle are released, the spring 24 urges the piston 18 toward the brake released position, and the spring 84 returns the spool valve 26 to the brake release position. It will be noted that the channel 46 also communicates fluid from the cavity 32 into the chamber 48, where it acts on the left side of the spool valve 26. Since equal hydraulic pressures are normally provided in the pressure chamber 20 and in the chamber 48, the spool valve 26 will normally be hydraulically balanced.

Figure 2:
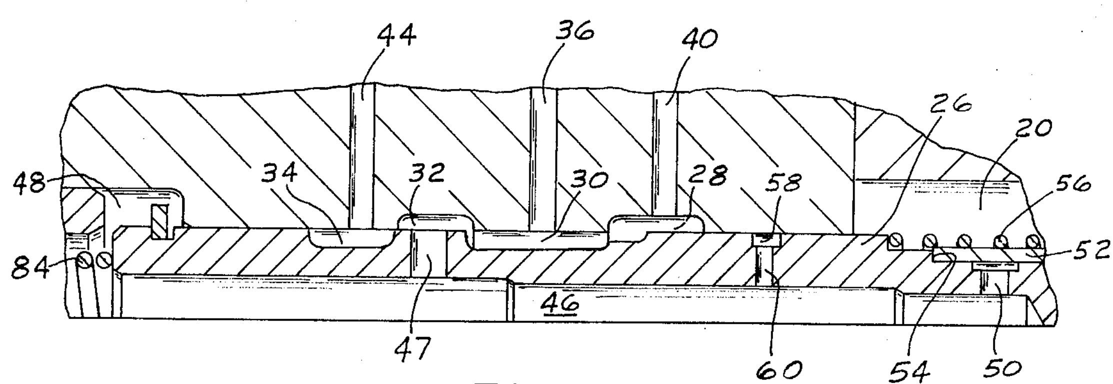
FIG. 2 is an enlarged, fragmentary, cross-sectional view of a portion of the spool valve and housing wall of the brake booster illustrated in FIG. 1.

If the vehicle operator continues to increase the force applied to the input rod 64, a state will be reached in which the pressure level in the chamber 20 is such that the braking pressure developed by the aforementioned master cylinder (not shown) approaches the maximum safe braking pressure for the vehicle's braking system. When this occurs, any increase in force applied to the rod 64 collapses the spring 56, so that the cap member 52 moves to the left viewing FIG. 1, closing the openings 50, thereby preventing further fluid communication between the inlet port 36 and the pressure chamber 20. This state is represented by FIG. 2. After the secondary valve or cap member 52 closes, thereby preventing further fluid communication of high pressure fluid into the pressure chamber 20, high pressure fluid may leak from the chamber 20 to the relatively low pressure fluid contained in the cavity 28 through the interface between the outer circumferential surface of the spool valve 26 and the wall of the bore 16. If this leakage occurs for a sufficiently long time, the spool valve 26 will become hydraulically unbalanced, since the pressure level in the pressure chamber 20 will be reduced, while relatively high pressure fluid will continue to act on the left hand end of the valve which projects into chamber 48. Since it is very undesirable for a spool valve to be hydraulically unbalanced, a seal must be provided between the valve and the wall of the bore between the pressure chamber 20 and the cavity 28. Prior art devices use a sliding rubber seal to prevent fluid communication through this interface. However, rubber seals have proven to be unsatisfactory for this purpose, because they are essentially high friction seals, and occasionally leak. Therefore, in the device illustrated in FIG. 1, the high pressure fluid in the channel 46 is communicated to the groove 58 through the radial passage 60. Since the channel 46 is always communicated to the high pressure fluid from the inlet of the pump during a brake application, this high pressure fluid is also communicated into the groove 58. Therefore, no fluid can leak between the pressure chamber 20 and the cavity 28, since the pressure level in the groove 58 is always at least equal to the pressure level in the chamber 20. While fluid may leak between the groove 58 and the cavity 28, this fluid is immediately replenished from the high pressure fluid in the channel 46. Therefore, the pressure level in the pressure chamber 20 is maintained at a uniformly high level, thereby assuring that the spool valve 26 will not become hydraulically unbalanced.

I claim:

1. In a valve mechanism for controlling fluid communication between a pressure chamber and a fluid pressure source;

a housing defining a bore therewithin having an inlet port communicated with said pressure source and an outlet port;

said bore communicating said inlet and outlet ports with said pressure chamber;

a spool slidably mounted in said bore and shiftable from a first position communicating substantially all of the fluid flowing into the inlet port to the outlet port to a second position communicating a portion of the fluid flowing into said outlet port to said pressure chamber;

said spool having an outer circumferential surface slidably engaging the wall of the bore; and a pressure seal to prevent flow of fluid through the interface defined between the spool valve and the wall of the bore, said pressure seal including passage means within said housing communicating high pressure fluid into said interface;

said spool defining a channel therewithin for communicating fluid from the inlet port to the pressure chamber when the spool valve is disposed in the second position;

said passage means extending through the wall of the spool to communicate said channel with the interface;

operator-operated means for shifting said spool; and auxiliary valve means carried on said spool for closing said channel to prevent flow of fluid into the pressure chamber upon further movement of the operator-actuated means after the spool valve is shifted to the second position.

2. The invention of claim 1:

said passage means communicating said channel with the section of the interface extending between the pressure chamber and the outlet port.

3. The invention of claim 2:

said spool having a groove extending circumferentially around the spool;

said passage communicating said groove with the channel.

4. In a valve mechanism for controlling communication between a pressure chamber and a fluid pressure source:

a housing defining a bore therewithin having an inlet port communicated with said fluid pressure source and an outlet port, said bore communicating said inlet and outlet ports with said pressure chamber;

a spool valve slidably mounted in said bore and shiftable from a first position communicating substantially all of the fluid flowing into the inlet port to the outlet port to a second position communicating at least a portion of the fluid flowing into the inlet port to the pressure chamber;

auxiliary valve means terminating communication with said pressure chamber when movement of said first valve means past said second position is attempted, thereby trapping fluid at a relatively high pressure level in said pressure chamber; and a pressure seal to prevent communication from said pressure chamber to said outlet port through the interface between the outer circumferential surface of the spool valve and said outlet port, said pressure seal including a conduit means communicating said interface with said inlet port.

5. The invention of claim 4:

said pressure seal including a circumferentially extending groove circumscribing said spool valve at said interface, said conduit means communicating said groove with said inlet port.

* * * * *